(12) United States Patent
Lee

(10) Patent No.: US 11,899,507 B2
(45) Date of Patent: Feb. 13, 2024

(54) DISPLAY DEVICE

(71) Applicant: Samsung Display Co., LTD., Yongin-si (KR)

(72) Inventor: Ji Heon Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 297 days.

(21) Appl. No.: 17/371,373

(22) Filed: Jul. 9, 2021

(65) Prior Publication Data

US 2022/0137673 A1    May 5, 2022

(30) Foreign Application Priority Data

Nov. 4, 2020    (KR) .................... 10-2020-0146272

(51) Int. Cl.
*G06F 1/16*    (2006.01)
(52) U.S. Cl.
CPC .......... *G06F 1/1681* (2013.01); *G06F 1/1616* (2013.01); *G06F 1/1624* (2013.01); *G06F 1/1652* (2013.01)

(58) Field of Classification Search
CPC .... G06F 1/1624; G06F 1/1626; G06F 1/1652; G06F 1/1681; H04M 1/0268
See application file for complete search history.

(56) References Cited

U.S. PATENT DOCUMENTS

| | | | |
|---|---|---|---|
| 8,711,566 B2 | 4/2014 | O'Brien | |
| 9,164,547 B1 | 10/2015 | Kwon et al. | |
| 10,263,982 B2 | 4/2019 | Kim | |
| 10,645,205 B2 | 5/2020 | Lee | |
| 10,659,576 B1 * | 5/2020 | Hsu | G06F 1/1624 |
| 2011/0063783 A1 * | 3/2011 | Shim | H04M 1/022 |
| | | | 361/679.01 |
| 2013/0342094 A1 * | 12/2013 | Walters | G06F 1/1681 |
| | | | 312/319.2 |
| 2015/0381929 A1 | 12/2015 | Lee | |
| 2016/0381014 A1 | 12/2016 | Kim | |
| 2018/0375975 A1 * | 12/2018 | Kikuchi | G06F 1/1686 |
| 2018/0375976 A1 * | 12/2018 | Kikuchi | H04M 1/0268 |
| 2020/0133340 A1 * | 4/2020 | Ou | H04M 1/0268 |
| 2020/0326754 A1 | 10/2020 | Kim et al. | |
| 2020/0329178 A1 | 10/2020 | Moon et al. | |
| 2021/0058502 A1 | 2/2021 | Liao et al. | |
| 2021/0120688 A1 * | 4/2021 | Wang | G06F 1/1681 |
| 2022/0269307 A1 * | 8/2022 | Lee | G06F 1/1624 |
| 2022/0286541 A1 * | 9/2022 | Lee | G06F 1/1681 |
| 2022/0317847 A1 * | 10/2022 | Kim | H04M 1/72454 |

FOREIGN PATENT DOCUMENTS

| | | |
|---|---|---|
| KR | 10-2015398 | 8/2019 |
| KR | 10-2019-0101605 | 9/2019 |
| KR | 10-2136826 | 7/2020 |
| WO | 2019/179281 | 9/2019 |

* cited by examiner

*Primary Examiner* — Anthony Q Edwards
(74) *Attorney, Agent, or Firm* — KILE PARK REED & HOUTTEMAN PLLC

(57) ABSTRACT

A display device includes a first body and a second body, a hinge part disposed between the first body and the second body and connected to the first body and the second body, a support plate connected to the first body and the second body, and a display panel attached to the support plate. The second body includes a first part and a second part that are slidably engaged, and the second part of the second body slides out from the first part of the second body.

20 Claims, 15 Drawing Sheets

DISPLAY DEVICE

CROSS-REFERENCE TO RELATED APPLICATION(S)

This application claims priority to and benefits of Korean Patent Application No. 10-2020-0146272 under 35 U.S.C. § 119, filed on Nov. 4, 2020 in the Korean Intellectual Property Office, the entire contents of which are incorporated herein by reference.

BACKGROUND

(a) Technical Field

This disclosure relates to a display device, and more particularly to a display device having a flexible structure capable of folding, bending, stretching, sliding, and/or the like.

(b) Description of the Related Art

Electronic devices, such as mobile phones, tablets, multimedia players, and televisions, include display devices for displaying images. Each of the display devices includes a display panel that implements a screen displaying an image. Flexible display devices capable of deformation such as bending, folding, rolling, and stretching by using flexible substrates for their display panels have been developed.

Among flexible display devices, a display device may be folded and unfolded like a book. The display device has an advantage of being able to be folded and compactly carried, and when used, it may be unfolded to enjoy a wide screen.

The above information disclosed in this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments have been made in an effort to provide a display device capable of exposing a portion of a screen in a folded state.

In an embodiment, a display device may include a first body and a second body, a hinge part disposed between the first body and the second body and connected to the first body and the second body, a support plate connected to the first body and the second body; and a display panel connected to the support plate. The second body may include a first part and a second part that are slidably engaged, and the second part of the second body may slide out from the first part of the second body.

The display panel may include screen which may be exposed in case that the second part of the second body slides out from the first part of the second body.

The first body may include a first set plate and the second body may include a second set plate. The second set plate may include a first part and a second part respectively corresponding to the first part of the second body and the second part of the second body. The support plate may be connected to the first set plate and the second part of the second set plate, and the support plate may not be connected to the first part of the second set plate.

The support plate may include a first flat portion, a second flat portion, and a bendable portion disposed between the first flat portion and the second flat portion. The first flat portion may be connected to the first set plate, the second flat portion may be connected to the second part of the second set plate, and the bendable portion may not be connected to the first set plate and not connected to the second set plate.

The bendable portion may be bent with respect to a bending shaft in a folded state where the first body and the second body face each other. The bending shaft may move in a sliding direction in case that the second part of the second body slides out from the first part of the second body.

A bent area of the bendable portion may move toward the first flat portion in case that the second part of the second body slides out from the first part of the second body.

A moving distance of the bending shaft may be half of a distance at which the second part of the second body slides out in case that the second part of the second body slides out from the first part.

A region of the display panel connected to the second flat part may be exposed in case that the second part of the second body slides out from the first part of the second body.

A distance between the first part of the second set plate and the second part of the second set plate may increase in case that the second part of the second body slides out from the first part of the second body.

The hinge part may include a shaft and hinges. The hinges may include a first hinge connected to the shaft and the first set plate, and a second hinge connected to the shaft and the first part of the second set plate.

In an embodiment, a display device may include a first body, a second body including a first part and a second part that are slidably engaged, a display panel disposed on the first body and the second body, and a support plate having a first surface facing the display panel and a second surface facing an opposite direction to the first surface. The first surface of the support plate may be connected to the display panel, and the second surface of the support plate may be connected to the first body and the second part of the second body, and the second surface of the support plate may not be connected to the first part of the second body.

The first body may include a first set plate and the second body may include a second set plate. The second set plate may include a first part and a second part respectively corresponding to the first part of the second body and the second part of the second body. The support plate may be connected to the first set plate and the second part of the second set plate, and the support plate may not be connected to the first part of the second set plate.

The support plate may include a first flat portion, a second flat portion, and a bendable portion disposed between the first flat portion and the second flat portion. The first flat portion may be connected to the first set plate, the second flat portion may be connected to the second part of the second set plate, and the bendable portion may not be connected to the first set plate and not connected to the second set plate.

The bendable portion may be bent with respect to a bending shaft in a folded state where the first body and the second body face each other. The bending shaft may move in a sliding direction in case that the second part of the second body slides out from the first part of the second body.

A bent area of the bendable portion may move toward the first flat portion in case that the second part of the second body slides out from the first part of the second body.

A moving distance of the bending shaft may be half of a distance at which the second part of the second body slides out in case that the second part of the second body slides out from the first part of the second body.

A region of the display panel connected to the second flat part may be exposed in case that the second part of the second body slides out from the first part of the second body.

A distance between the first part of the second set plate and the second part of the second set plate may increase in case that the second part of the second body slides out from the first part of the second body.

The display device may further include a hinge part connected to the first body and the second body, and the hinge part may include a shaft and hinges. The hinges may include a first hinge connected to the shaft and the first set plate, and a second hinge connected to the shaft and the first part of the second set plate.

The first part of the second body may include a wing and a guide that are perpendicular to each other, and the second part of the second body may include a wing and a guide that are perpendicular to each other. An inner surface of the wing of the second part may contact an outer surface of the wing of the first part, and an outer surface of the guide of the second part may contact an inner surface of the guide of the first part.

According to the embodiments, the display device may expose a portion of the screen in a folded state. Other advantageous effects may be recognized throughout the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
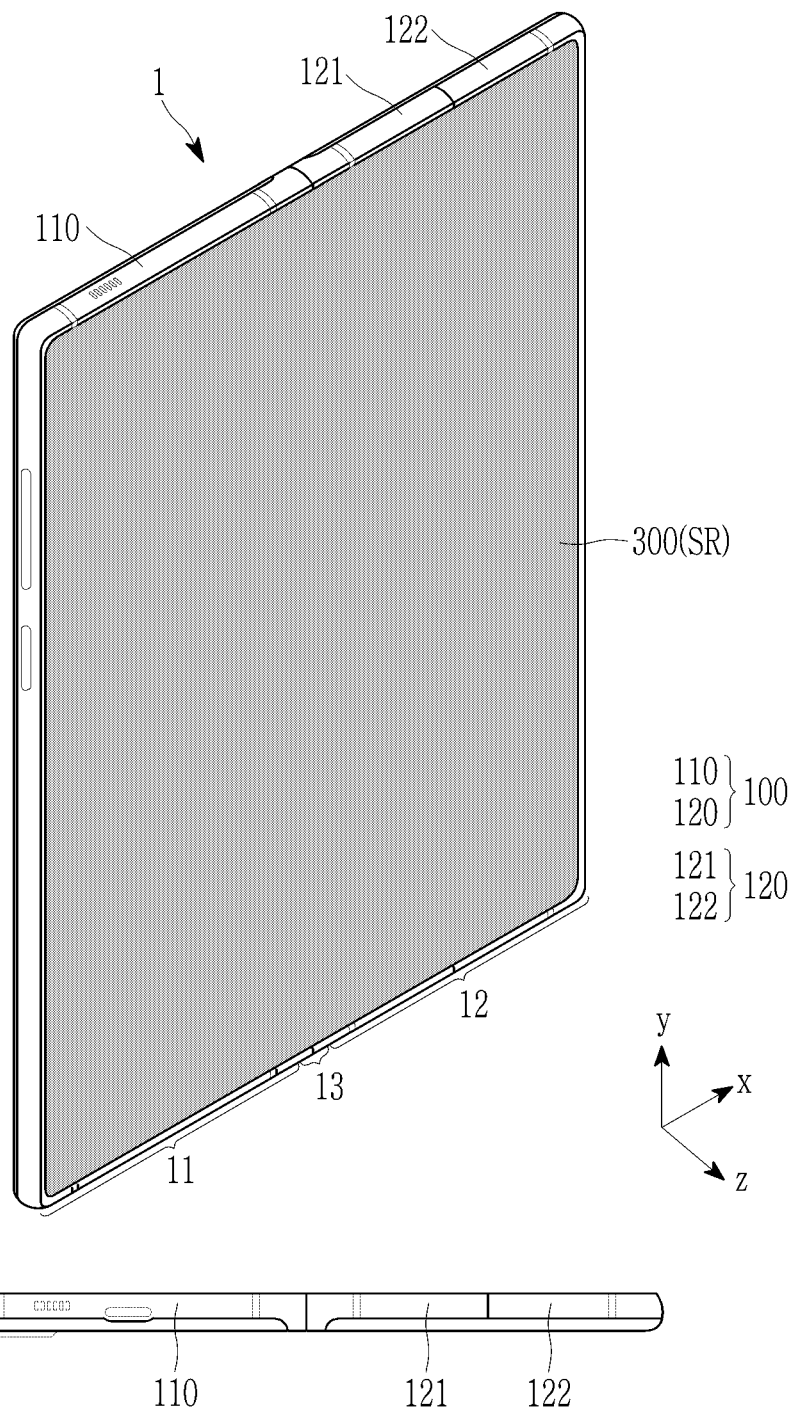
FIG. 1, FIG. 2, and FIG. 3 each illustrate a schematic perspective view and a schematic bottom view of a display device according to an embodiment.

The disclosure will be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

It will be understood that when an element such as a layer, film, area, or substrate is referred to as being "on" another element, it can be directly on the other element or intervening elements may also be present. In contrast, when an element is referred to as being "directly on" another element, there are no intervening elements present. The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In the specification, unless explicitly described to the contrary, the word "comprise" and variations such as "comprises" or "comprising" will be understood to imply the inclusion of stated elements but not the exclusion of any other elements.

In the specification, "connected" means that two or more components are not only directly connected, but two or more components may be connected indirectly through other components, physically connected as well as being electrically connected, or it may be referred to by different names depending on the location or function, but may include connecting each of parts that are substantially integral to each other.

In the drawings, signs "x", "y", and "z" are used to indicate directions, wherein x is used for indicating a first direction, y is used for indicating a second direction that is perpendicular to the first direction, and z is used for indicating a third direction that is perpendicular to the first direction and the second direction. The first direction x, the second direction y, and the third direction z may correspond to a horizontal direction, a vertical direction, and a thickness direction of the display device, respectively.

Unless otherwise described in the specification, "overlapping" indicates overlapping in a plan view, and indicates overlapping in the third direction z. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
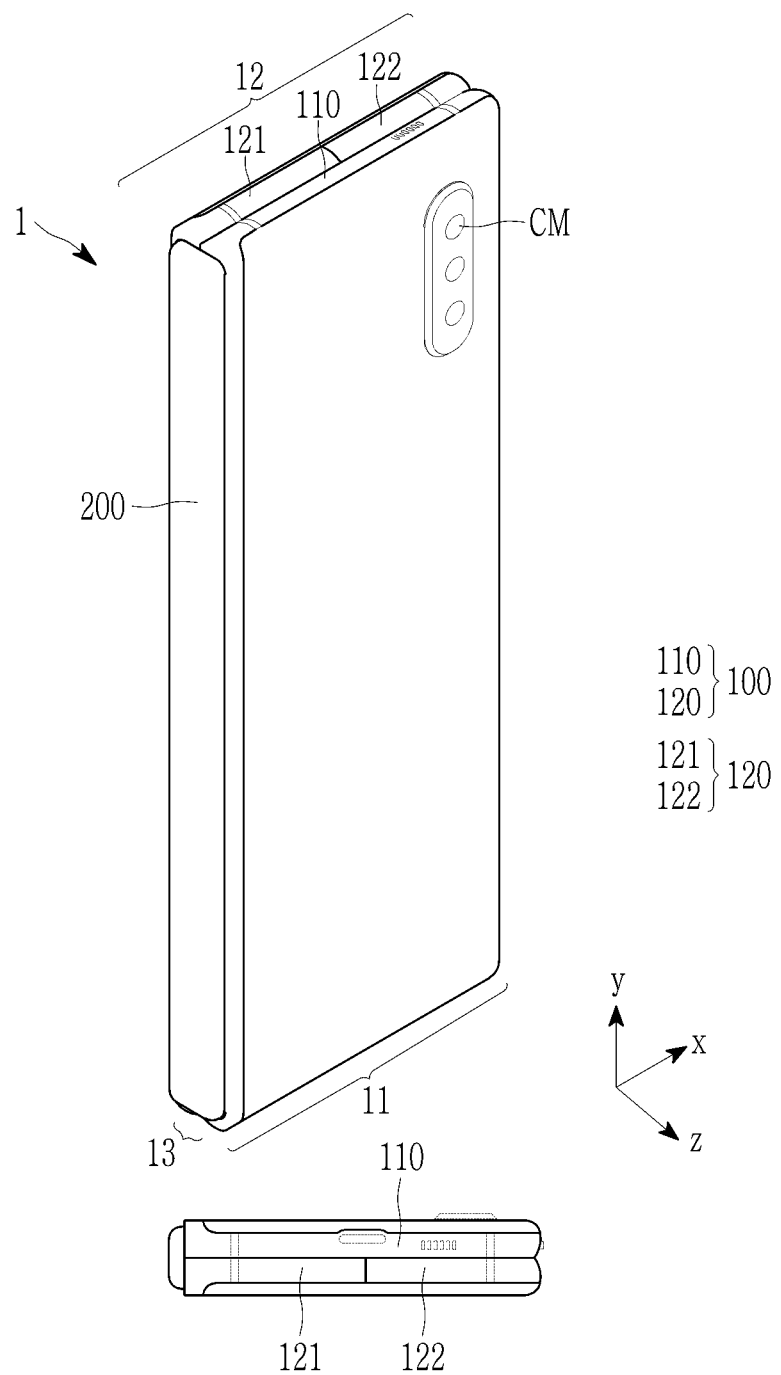
Figure 3:
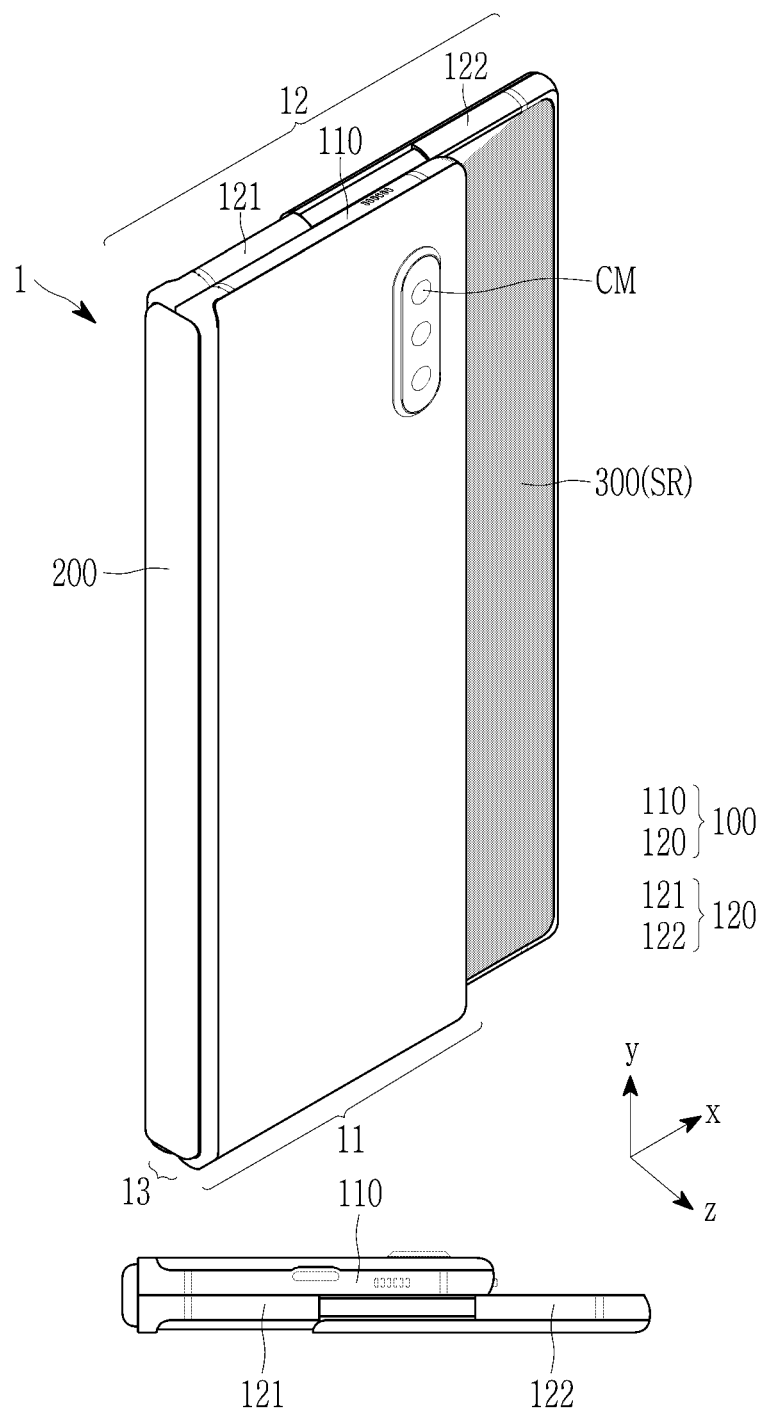

FIG. 1, FIG. 2, and FIG. 3 each illustrate a schematic perspective view and a bottom view of a display device 1 according to an embodiment. FIG. 1 illustrates an unfolded state of the display device 1, FIG. 2 illustrates a folded state of the display device 1, and FIG. 3 illustrates a folded and slid state of the display device 1.

The display device 1 may be an electronic device that includes a main function of displaying an image. The display device 1 may be implemented as, e.g., an electronic device such as a smartphone, a mobile phone, a tablet, a multimedia player, or a game console, or may be applied to such an electronic device.

As illustrated in FIG. 1, the display device 1 may be generally flatly unfolded. The display device 1 may include a first flat area 11, a second flat area 12, and a bendable area 13 between the first flat area 11 and the second flat area 12. The bendable area 13 is an area that is bent when the display device 1 is folded, and the first flat area 11 and the second flat area 12 are areas that are not bent when the display device 1 is folded. The bendable area 13 may be bent around an axis that is parallel to the second direction y.

Although one bendable area 13 is illustrated, the display device 1 may include multiple bendable areas 13 that are spaced apart from each other, can be bent with different radii of curvature, or can be bent around different bending axes. Although the bendable area 13 is illustrated to be positioned approximately at a center of the display device 1, the position and width of the bendable area 13 of the display device 1 may be changed in the embodiments.

The display device 1 includes a body 100. The body 100 may be referred to as a set, a set frame, or a housing. The body 100 may form overall appearance of the display device 1, and various components constituting the display device 1, such as a processor, a memory, a driving device, a printed circuit board, a battery, a communication module, a speaker, and various sensors, may be accommodated therein. The body 100 may include a first body 110 corresponding to the first flat area 11 and a second body 120 corresponding to the second flat area 12. The first body 110 and the second body 120 may form a pair with each other. The second body 120 may include a first part 121 and a second part 122 that are slidably engaged with each other.

The display device 1 includes a hinge part 200. The hinge part 200 may be connected (or attached) to the body 100. The hinge part 200 is connected (or attached) to the first body 110 and the second body 120 to allow the display device 1 to be folded and unfolded. When the display device 1 is folded, the first body 110 and the second body 120 may face each other, while when the display device 1 is unfolded, the first body 110 and the second body 120 may be disposed in parallel. The hinge part 200 may serve as a rotation axis of the bendable area 13, and may allow the bendable area 13 to be bent. Accordingly, the display device 1 may be generally deformed between folding and unfolding.

The display device 1 includes a display panel 300 which includes a screen SR on which an image is displayed. The screen SR may correspond to a display area in which pixels are arranged in the display panel 300. The bendable area 13 may be positioned across the screen SR in the second direction y.

As illustrated in FIG. 2, the display device 1 may be folded such that portions of the screen face each other, i.e., a screen portion of the first flat area 11 and a screen portion of the second flat area 12 face each other. In a folded state, a screen area of the bendable area 13 may be covered. When the first flat area 11 and the second flat area 12 are substantially the same, the entire screen SR may be covered by the body 100 of the display device 1 in the folded state.

As illustrated in FIG. 3, the second flat area 12 (or the second body 120 may be expanded in the folded state to expose a portion of the screen SR. The exposed screen SR may be a part of the screen portion of the second flat area 12. The second body 120 may include a first part 121 and a second part 122 that are slidably engaged with each other to expand the second flat area 12. For example, when the second part 122 slides out from the first part 121 (hereinafter, referred to as a "slide-out state"), the second flat area 12 may expand in a first direction x. In case that the second part 122 completely slides out, a width of the second flat area 12 may increase from about 1.3 times to about 1.7 times, for example, about 1.5 times, than before sliding. As the second part 122 slides out, an area of the screen SR to be exposed may gradually increase. In case that the second part 122 completely slides out to a designed range, about 30% to about 70%, for example, about 50%, of the screen portion of the second flat area 12 may be exposed, and about 15% to about 35%, for example, about 25%, of the entire screen SR may be exposed. When the second flat area 12 is expanded, the first flat area 11 may maintain an original area. A mechanism by which the screen SR is exposed when the second part 122 slides out will be described later.

The display device 1 may include a camera CM. The camera CM may be positioned on the body 100, for example, the first body 110, and may be a rear-facing camera in which a lens is exposed to an opposite side to the screen SR.

In case that the display device 1 is unfolded as illustrated in FIG. 1, the display panel 300 is activated to display an image on the screen SR. In case that the display device 1 is folded as illustrated in FIG. 2, the display panel 300 may be deactivated. In case that the display device 1 slides out as illustrated in FIG. 3, the display panel 300 is activated to display an image on the exposed screen SR. Accordingly, a user may use the rear-facing camera as a self-camera like a normal front-facing camera by pointing a lens of the camera CM and the exposed screen SR toward themselves in the slide-out state, and an image captured by the camera may be checked through the exposed screen SR.

As described above, there are at least the following advantages by providing the screen SR in a slide manner while the display device 1 is folded. A front-facing camera may be positioned at a same side as the screen SR (i.e., the front side) by sacrificing a portion of a front area where the screen SR is positioned, or self-photographing or video calling may be possible with the rear-facing camera CM and the front screen SR even when an additional screen is not disposed at an opposite side to the screen SR, for example, in a rear area of the first body 110. Since it is not necessary to place the camera in front of the display device 1, cost may be reduced, and a front surface of the display device 1 may be designed to be substantially filled with the screen SR. An image may be displayed by exposing the screen SR positioned therein even in the folded state without unfolding the display device 1, and a message, a time, and the like displayed through the image may be checked, for example.

Figure 4:
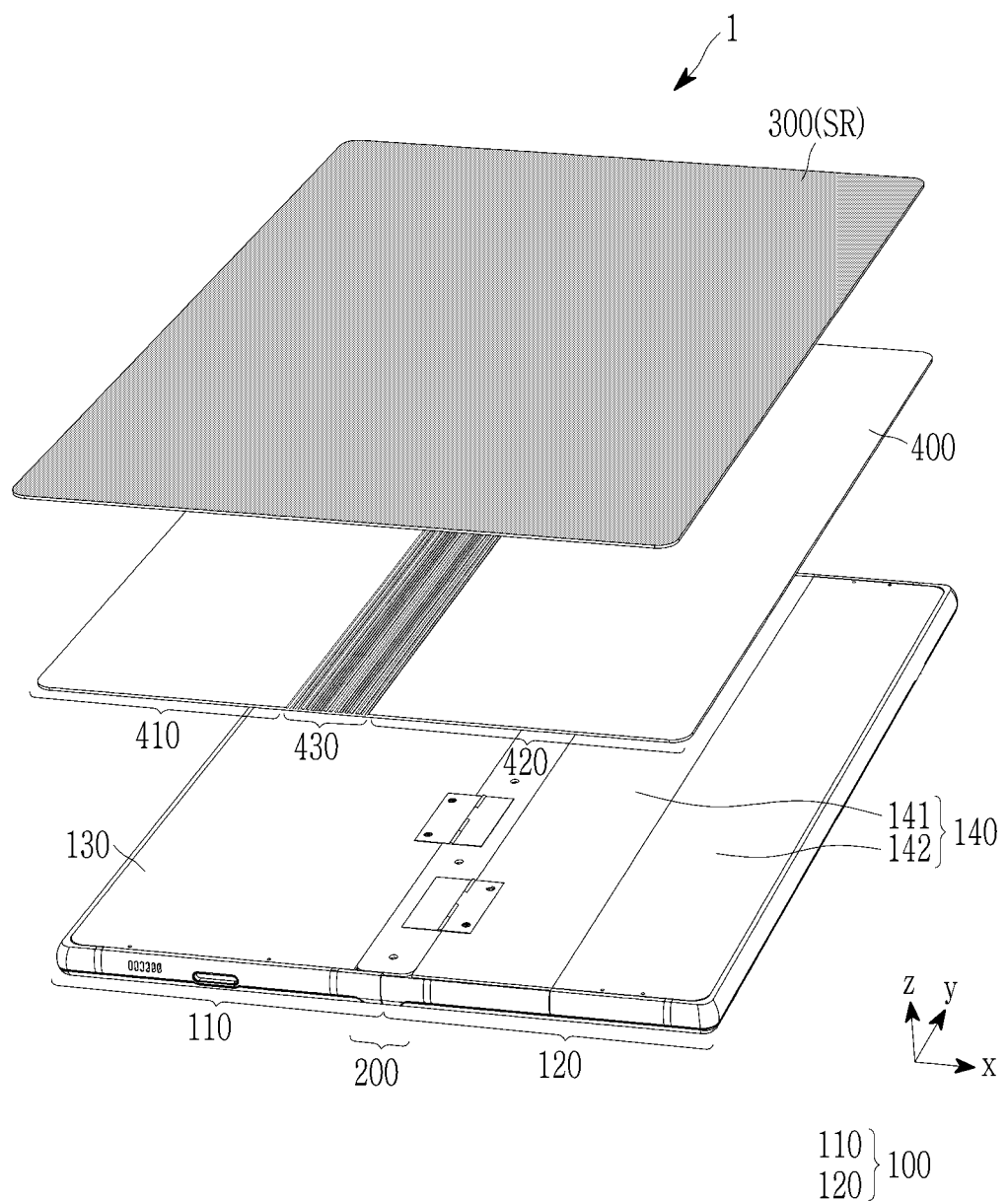
FIG. 4 illustrates a schematic exploded perspective view of a display device according to an embodiment.
Figure 5:
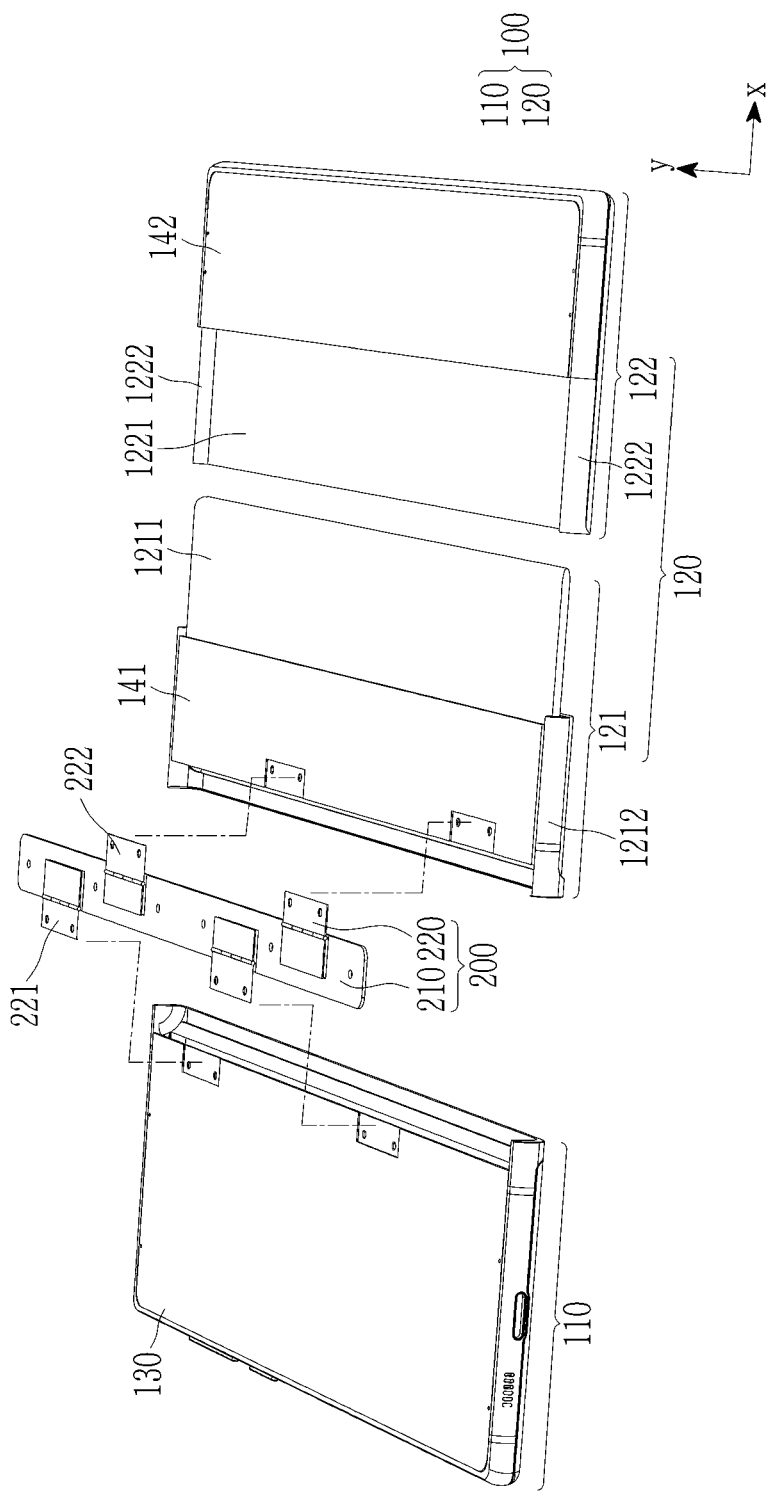
FIG. 5 illustrates a schematic exploded perspective view of a body and a hinge part according to an embodiment.

FIG. 4 illustrates a schematic exploded perspective view of the display device 1 according to an embodiment, and FIG. 5 illustrates a schematic exploded perspective view of the body 100 and the hinge part 200 according to an embodiment.

Referring to FIG. 4 and FIG. 5, the display device 1 may include the body 100, the hinge part 200, the display panel 300, and a supporting plate 400.

The body 100 may include the first body 110 and the second body 120. The first body 110 may include a first set plate 130, and the second body 120 may include a second set plate 140. Each of the first set plate 130 and the second set plate 140 may provide a flat upper surface of the body 100. The second set plate 140 may include a first part 141 and a second part 142 that are separated from each other. Edges of the first part 141 and the second part 142 of the second set plate 140 may contact each other even in the folded state without unfolding the display device 1. Facing edges of the first part 141 and the second part 142 may be separated from each other in a state where the display device 1 is folded and slides out. As the second flat area 12 expands after the display device 1 is folded, a distance between the first part 141 and the second part 142 may gradually increase.

The first part 121 (of the second body 120) may include a first wing 1211 and a first guide 1212, and the second part 122 may include a second wing 1221 and a second guide 1222, in order for the first part 121 and the second part 122 of the second body 120 to be slidably engaged. The first wing 1211 and the first guide 1212 may be substantially vertical, and the second wing 1221 and the second guide 1222 may be substantially vertical. An inner surface of the second wing 1221 of the second part 122 may contact an outer surface of the first wing 1211 of the first part 121, and an outer surface of the second guide 1222 of the second part 122 contact an inner surface of the first guide 1212 of the first part 121. When sliding out or sliding back in, the second part 122 may accurately slide in a direction due to the contact between components of the first part 121 and the second part 122.

In another example, the outer surface of the second wing 1221 of the second part 122 may be configured to closely contact the inner surface of the first wing 1211 of the first part 121, and the inner surface of the second guide 1222 of the second part 122 may be configured closely contact with the outer surface of the first guide 1212 of the first part 121. The embodiments may include other slidable coupling structures of the first part 121 and the second part 122.

The hinge part 200 may include spindles 210 and hinges 220. The spindles 210 may be positioned to extend along a second direction y. Each of the hinges 220 may have a first side connected (or coupled or attached) to a corresponding spindle 210 and a second side connected (or coupled or attached) to the first body 110 or the second body 120. Hinges 221 connected (or coupled or attached) to the first body 110 and hinges 222 connected (or coupled or attached) to the second body 120 may be alternately positioned along the second direction y. The hinges 221 may be connected (or coupled or attached) to the first set plate 130 in the first body 110. The hinges 222 may be connected (or coupled or attached) to the first part 141 in the first body 120.

The hinge part 200 may have a biaxial hinge structure. For example, rotation axes of the hinges 221 connected (or coupled or attached) to the first body 110 and rotation axes of the hinges 222 connected (or coupled or attached) to the second body 120 may be different. In other examples hinge part 200 may have a single-axis hinge structure.

The display panel 300 may be a panel in which pixels capable of displaying an image are formed on a substrate. The display panel 300 may include light emitting elements corresponding to pixels. The light emitting elements may be light emitting diodes (LED) such as organic light emitting diodes or micro-light-emitting diodes. The display panel 300 may be a flexible panel capable of bending at least in a portion. The display panel 300 may be disposed on the first flat area 11, the bendable area 13, and the second flat area 12. The display panel 300 may be disposed on the first body 110 and the second body 120. For example, in the display panel 300, at least an area corresponding to the bendable area 13 of the display device 1 may be flexible and bent. In other examples, the entire display panel may be flexible.

The support plate 400 may be disposed on a rear surface of the display panel 300 to support the display panel 300. The support plate 400 may include a first flat portion 410 and a second flat portion 420, and a bendable portion 430 between the first flat portion 410 and the second flat portion 420. The first flat portion 410 and the second flat portion 420 may support flat areas of the display panel 300, and the first flat portion 410 and the second flat portion 420 may be metal plates. The bendable portion 430 may support the bendable area of the display panel 300 when the display device 1 is connected between the first flat portion 410 and the second flat portion 420 to be unfolded, folded, and folded and slid. The bendable portion 430 may have a multi joint structure including segments that are rotatably connected to each other. The bendable portion 430 may be bent around an axis that is parallel to the second direction y. An area of the display panel 300 corresponding to the bendable portion 430 (i.e., an area attached to or in contact with the bendable portion 430) may be flexible and bent.

In case that the display device 1 is unfolded or folded, the entire first flat portion 410 and a portion of the bendable portion 430 may correspond to the first flat area 11, the entire second flat portion 420 may correspond to the second flat area 12, and a portion of the bendable portion 430 may correspond to the bendable area 13. The bendable portion 430 may extend over the first flat area 11 and the bendable area 13. In case that the display device 1 is partially slid out after being folded, the bendable portion 430 may extend over the first flat area 11, the bendable area 13, and the second flat area 12. In case that the display device 1 is completely slid out after being folded, the bendable portion 430 may extend over the bendable area 13 and the second flat area 12.

The support plate 400 may be attached to the display panel 300 by an adhesive such as a pressure-sensitive adhesive (PSA) or an optically clear adhesive (OCA). All areas of a first surface of the support plate 400 facing the display panel 300 may be attached to the display panel 300. In case that the display device 1 is unfolded, the first flat portion 410, the second flat portion 420, and the bendable portion 430 may be generally flatly unfolded. In case that the display device 1 is unfolded, the display panel 300 may also be generally flatly unfolded. The display panel 300 may behave in a same manner as the support plate 400 together with the support plate 400.

A second surface of the support plate 400 (a surface facing the opposite direction to the first surface) may be attached to the first set plate 130 and the second set plate 140 by an adhesive such as a pressure-sensitive adhesive (PSA) or an optically clear adhesive (OCA). The first flat portion 410 may be attached to the first set plate 130, and the second flat portion 420 may be attached to the second part 142 of the second set plate 140. However, no portion of the support plate 400 may be attached to the first part 141 of the second set plate 140. The second flat portion 420 may be attached only to the second part 142, and may not be attached to the first part 141. The bendable portion 430 of the support plate 400 may not be attached to either the first set plate 130 or to the second set plate 140.

Figure 6:
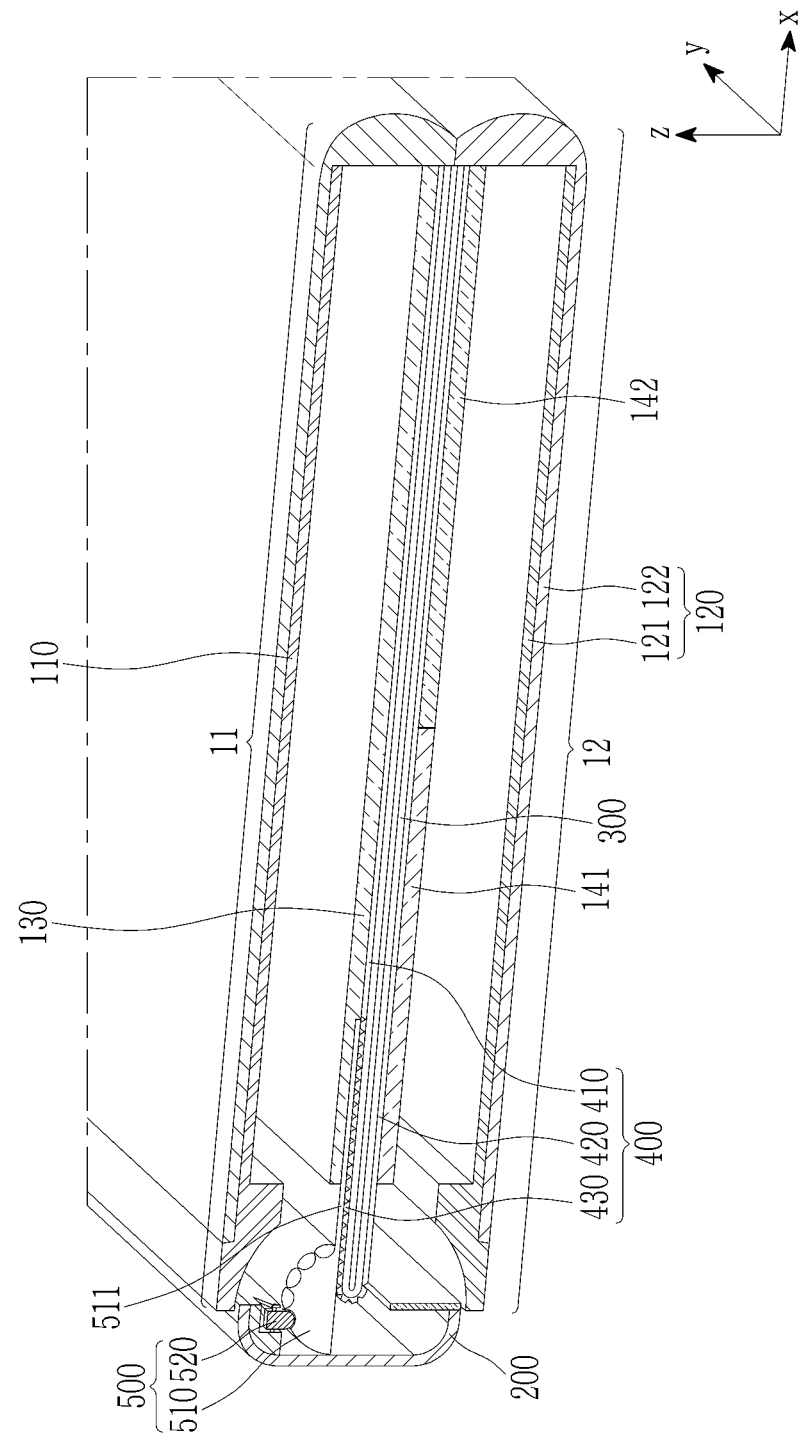
FIG. 6, FIG. 7, and FIG. 8 each illustrate a schematic cross-sectional view showing a folding state in a display device according to an embodiment.
Figure 7:
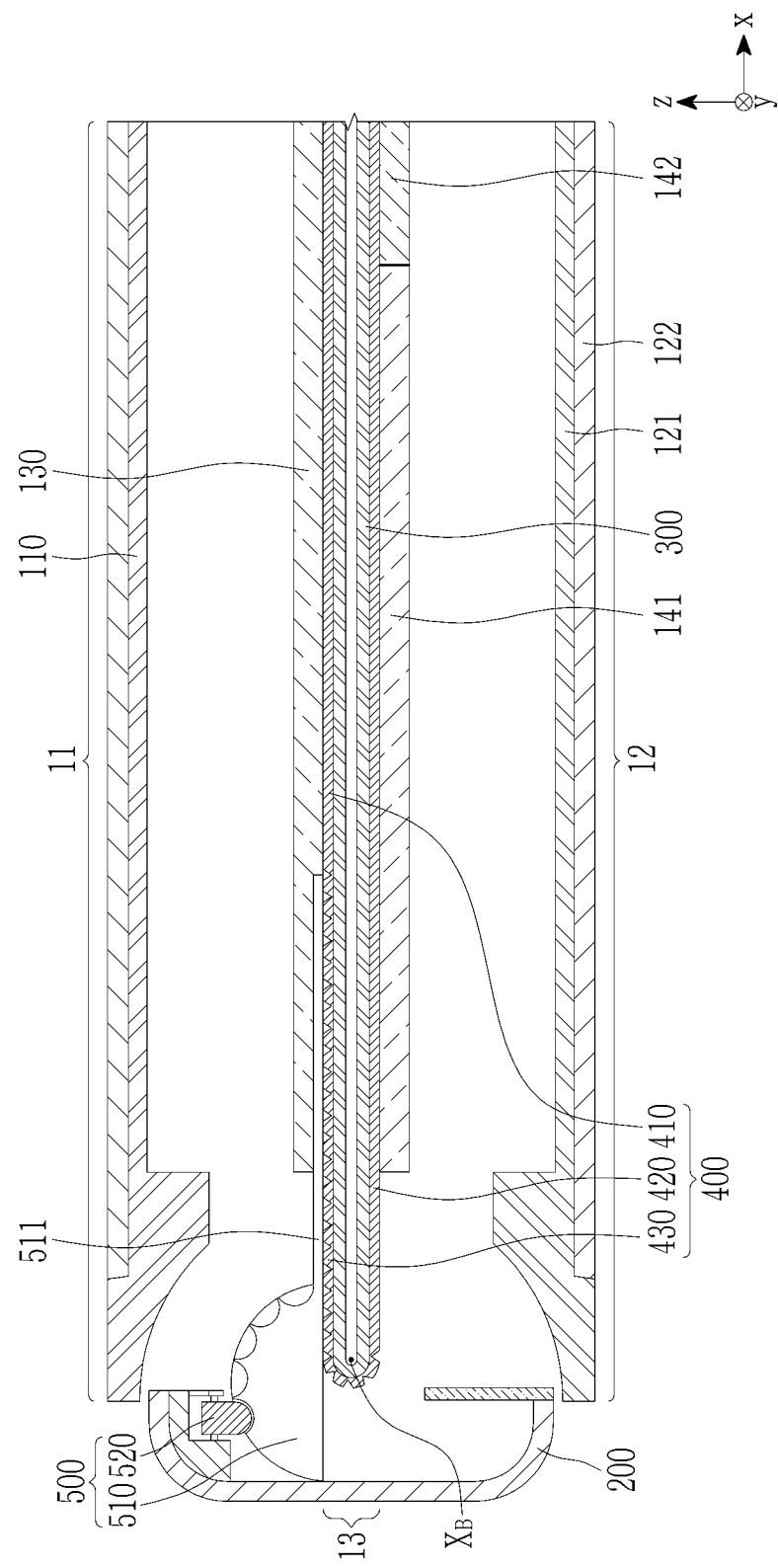
Figure 8:
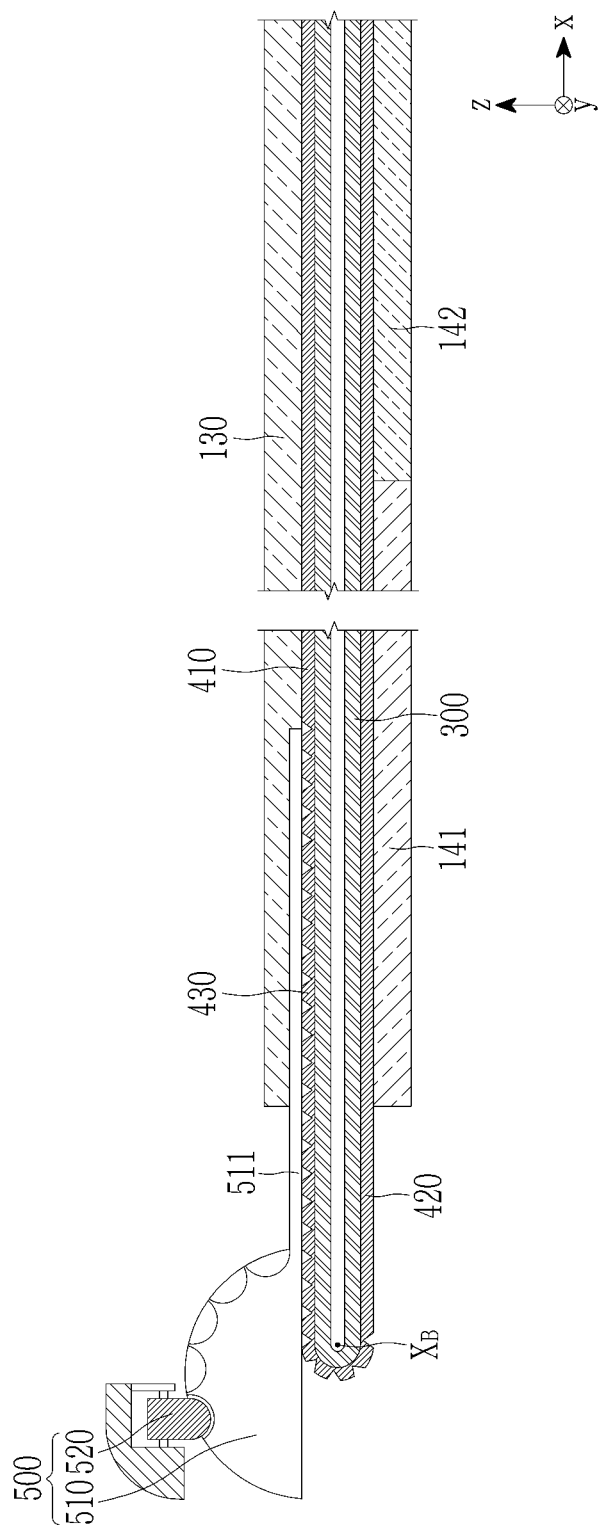

FIG. 6, FIG. 7, and FIG. 8 each illustrate schematic cross-sectional views showing a folded state in the display device 1 according to an embodiment.

FIG. 6 illustrates a perspective view of a schematic cross-sectional view of a substantially lower end of the display device 1 cut in the first direction x, FIG. 7 illustrates a schematic cross-sectional view showing a further enlarged area adjacent to the hinge part 200 in FIG. 6, and FIG. 8 illustrates a schematic cross-sectional view showing a further enlarged view of the support plate 400 and components adjacent thereto in FIG. 6. FIG. 6, FIG. 7, and FIG. 8 each illustrate a schematic cross-sectional view in a state in which the components illustrated in FIG. 4 and FIG. 5 are combined, and a movement limiting part 500 is further illustrated. A cross-section of a substantially upper end of the display device 1 may be substantially the same as illustrated. A cross-section of a substantially middle portion of the display device 1 may be substantially the same except for a protrusion 520.

In case that the display device 1 is folded, the display panel 300 and the support plate 400 are bent in the bendable area 13. A region adjacent to the second flat portion 420 in the bendable portion 430 of the support plate 400 is bent. The bendable portion 430 and the display panel 300 may be bent around a bending shaft $X_B$ that is parallel to the second direction y. An area that is other than the bent area in the bendable portion 430 may be in a flat state. Such a flat area may be wider than the area that is bent in the bendable portion 430. The first flat portion 410 and the bendable portion 430 of the support plate 400 may be partially positioned in the first flat area 11, and the second flat portion 420 of the support plate 400 may be positioned in the second flat area 12.

The first part 141 and the second part 142 of the second set plate 140 may contact each other so that a surface of the first part 141 and the surface of the second part 142 facing the second flat portion 420 of the support plate 400 may form a continuous smooth plane. The first part 121 and the second part 122 of the second body 120 may be engaged over substantially the entire area of the second flat area 12.

The display device 1 may include the movement limiting part 500. The movement limiting part 500 may include a gear part 510 having grooves formed thereon and a protrusion 520. The gear part 510 may include an extension 511 that is parallel to the first set plate 130. The extension 511 may be connected (or coupled or attached) to the first set plate 130, and may constitute a portion of the first set plate 130. The extension 511 may be positioned between the first set plate 130 and the support plate 400. The extension 511 may face the bendable portion 430 of the support plate 400.

A surface of the extension 511 may constitute a plane with a surface of the first set plate 130 that does not overlap the extension 511 while facing the first flat portion 410. The protrusion 520 may protrude from the hinge part 200, or may be connected (or coupled or attached) to the hinge part 200.

In case that the display device 1 is folded, the protrusion 520 may engage with, for example, a groove closest to the hinge part 200 among the grooves of the gear part 510. As the display device 1 is unfolded, the protrusion 520 may engage with the grooves of the gear part 510 that are gradually distant from the hinge part 200 among the grooves of the gear part 510. As such, when the protrusion 520 is engaged with the grooves of the gear part 510 to unfold or fold the display device 1, it restricts relative movement of the first flat area 11 and the second flat area 12 to some extent, thereby allowing the display device 1 to maintain an unfolded state, a folded state, or an unfolded state at an angle.

In another example, the movement limiting part 500 may be provided so that the extension 511 is connected (or coupled or attached) with the first part 141 of the second set plate 140.

Figure 9:
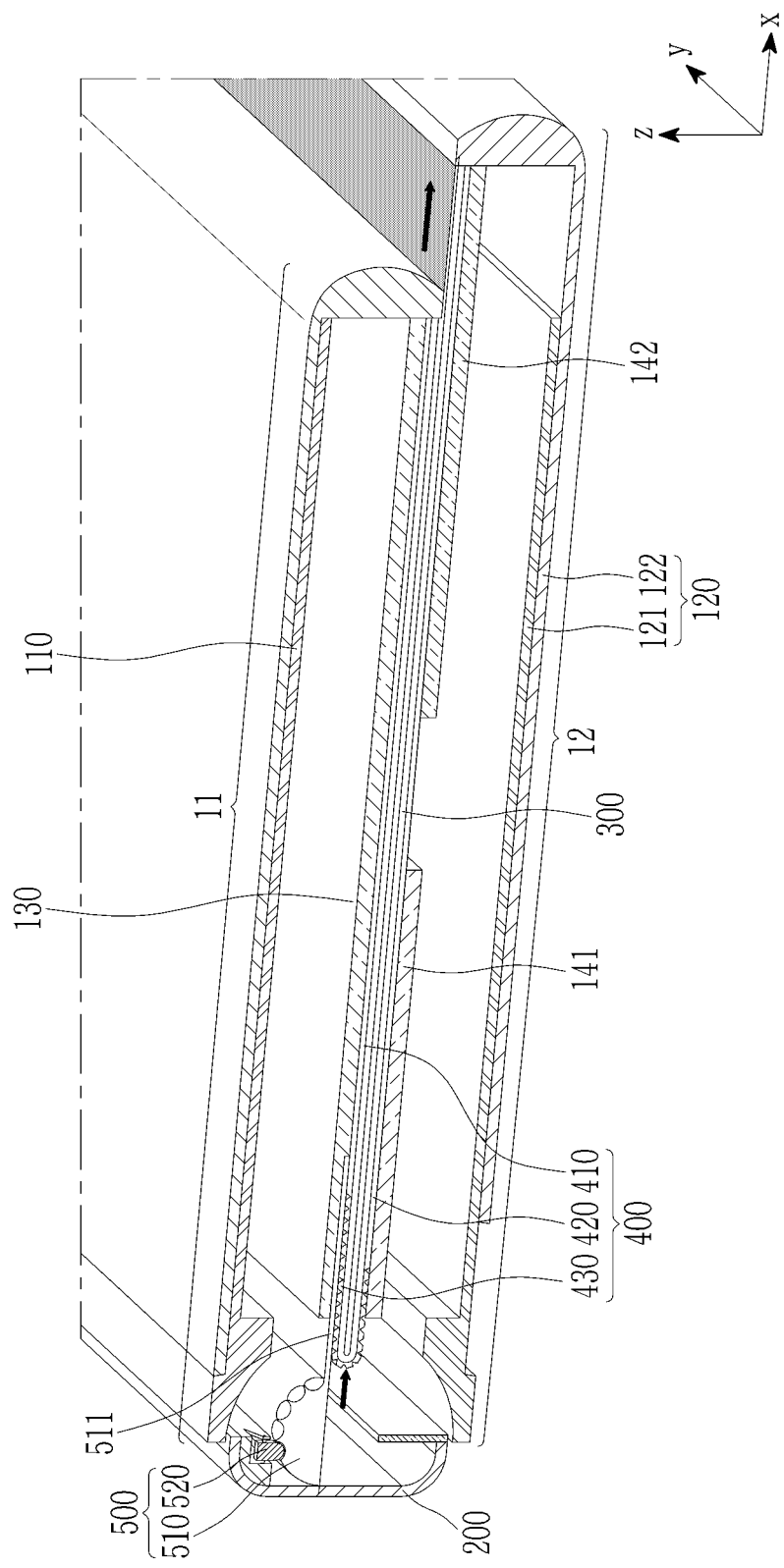
FIG. 9, FIG. 10, and FIG. 11 each illustrate schematic cross-sectional views showing partially sliding states in a display according to an embodiment.
Figure 10:
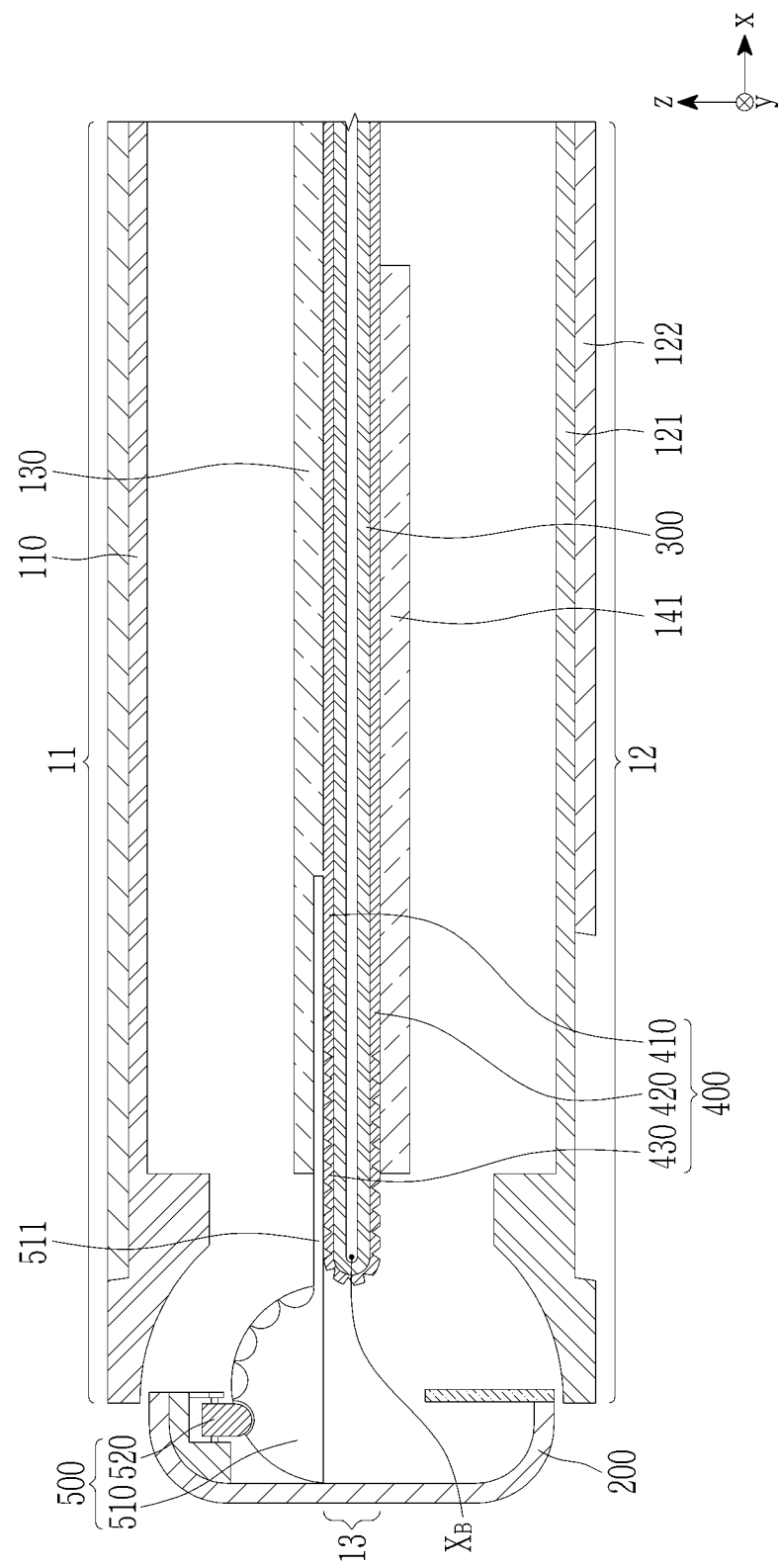
Figure 11:
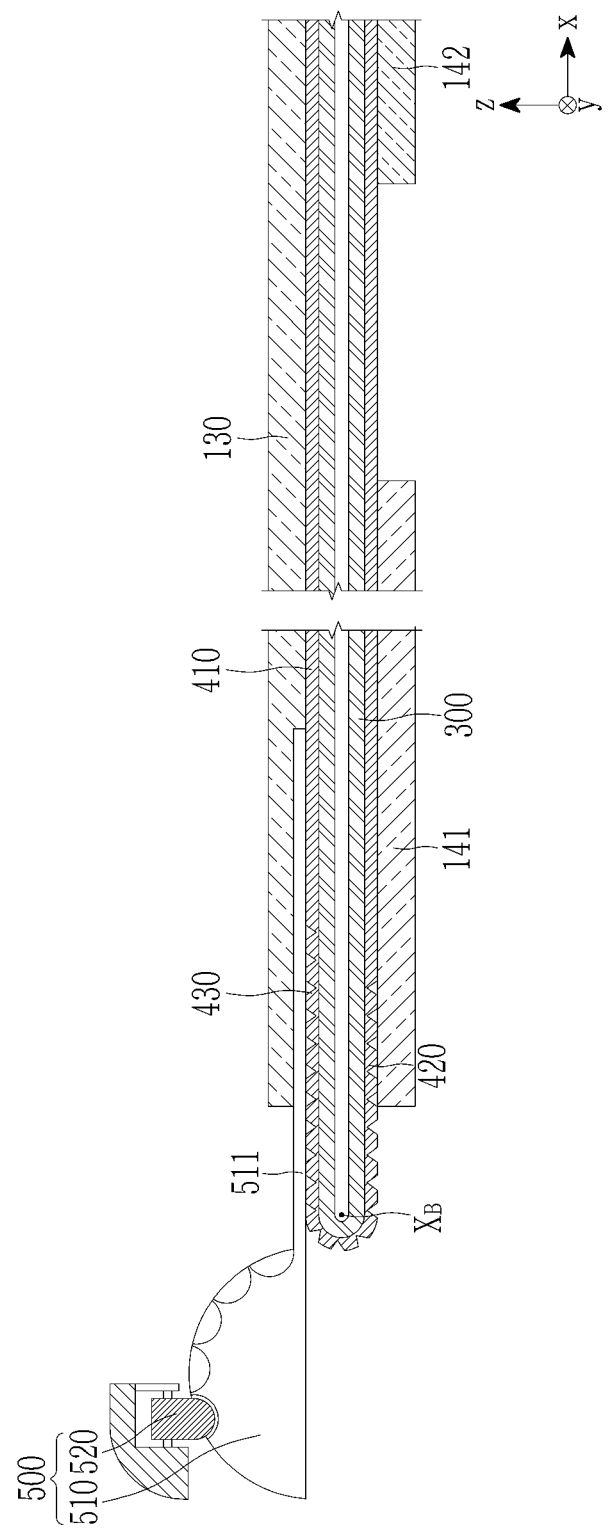

FIG. 9, FIG. 10, and FIG. 11 each illustrate schematic cross-sectional views showing a partial slide-out state in a display according to an embodiment. FIG. 9, FIG. 10, and FIG. 11 correspond to FIG. 6, FIG. 7, and FIG. 8, respectively.

FIG. 9, FIG. 10, and FIG. 11 illustrate a state in which the second flat area 12 is partially expanded in a state where the display device 1 is folded. In case that a user pulls, for example, the second part 122 of the second body 120 in the first direction x, the second part 122 slides out. The second part 142 of the second set plate 140 connected (or coupled or attached) to the second part 122 moves in the first direction x, and the second flat portion 420 of the support plate 400 attached to the second part 142 also moves in the first direction x.

Since the second flat portion 420 and the bendable portion 430 of the support plate 400 are not attached to the first set plate 130 or to the first part 141 of the second set plate 140, the bent area of the bendable portion 430 may gradually move toward the first flat portion 410, the bendable portion 430 and the bending shaft $X_B$ may move in the first direction while the bendable portion 430 is pulled in the first direction x as the second flat portion 420 moves in the first direction x. The distance at which the bendable portion 430 and the bending shaft $X_B$ of the display panel 300 move in the first direction x may be about half of the distance at which the second part 122 slides out. Since the display panel 300 is attached to the support plate 400, the display panel 300 also moves together with the support plate 400, and the screen SR provided by the display panel 300 may be partially exposed.

In case that the second part 122 slides out, the first flat portion 410 attached and fixed to the first set plate 130 does not move or slide, and the portion of the display panel 300 attached to the first flat portion 410 does not move or slide.

Figure 12:
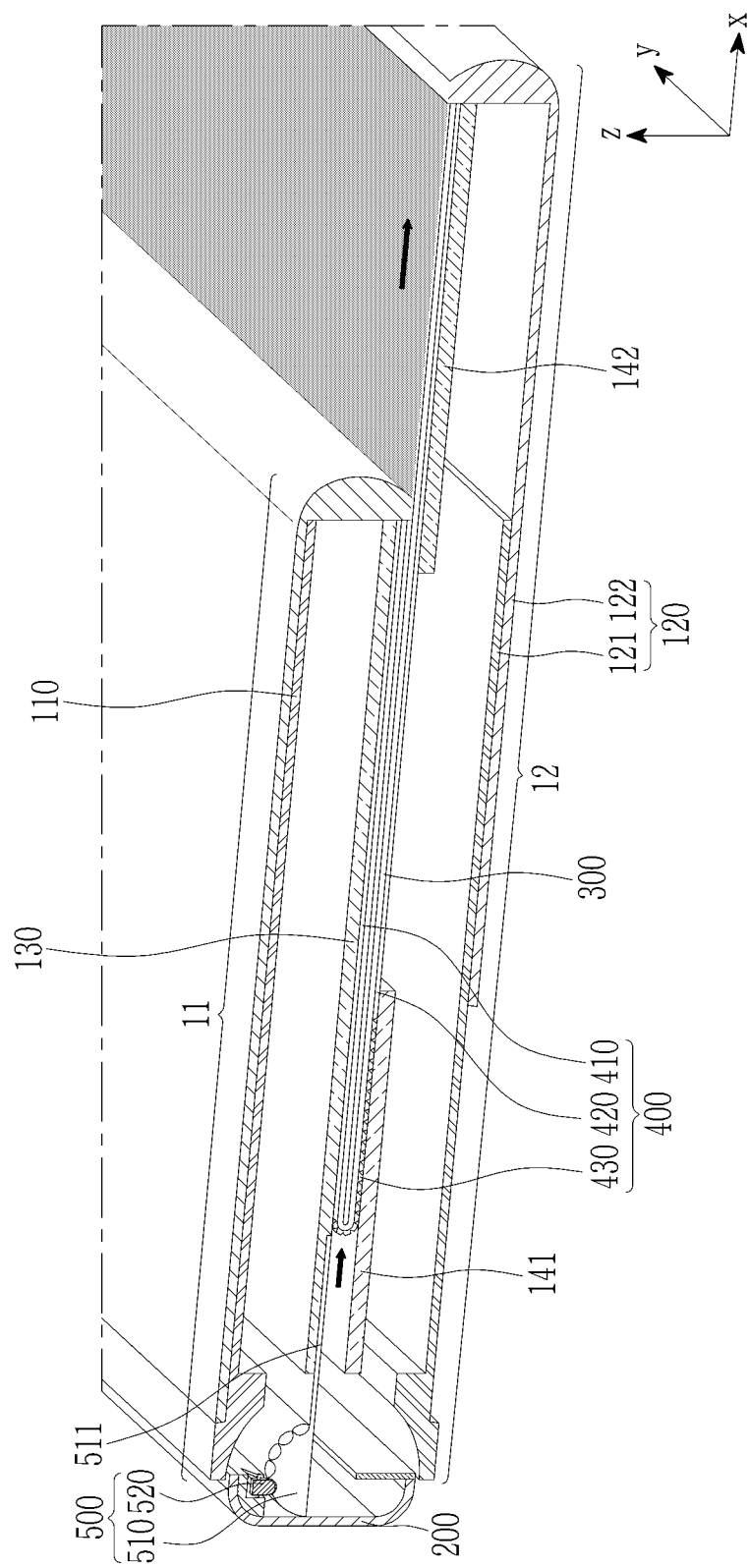
FIG. 12, FIG. 13, and FIG. 14 each illustrate schematic cross-sectional views showing a complete sliding state in a display according to an embodiment.
Figure 13:
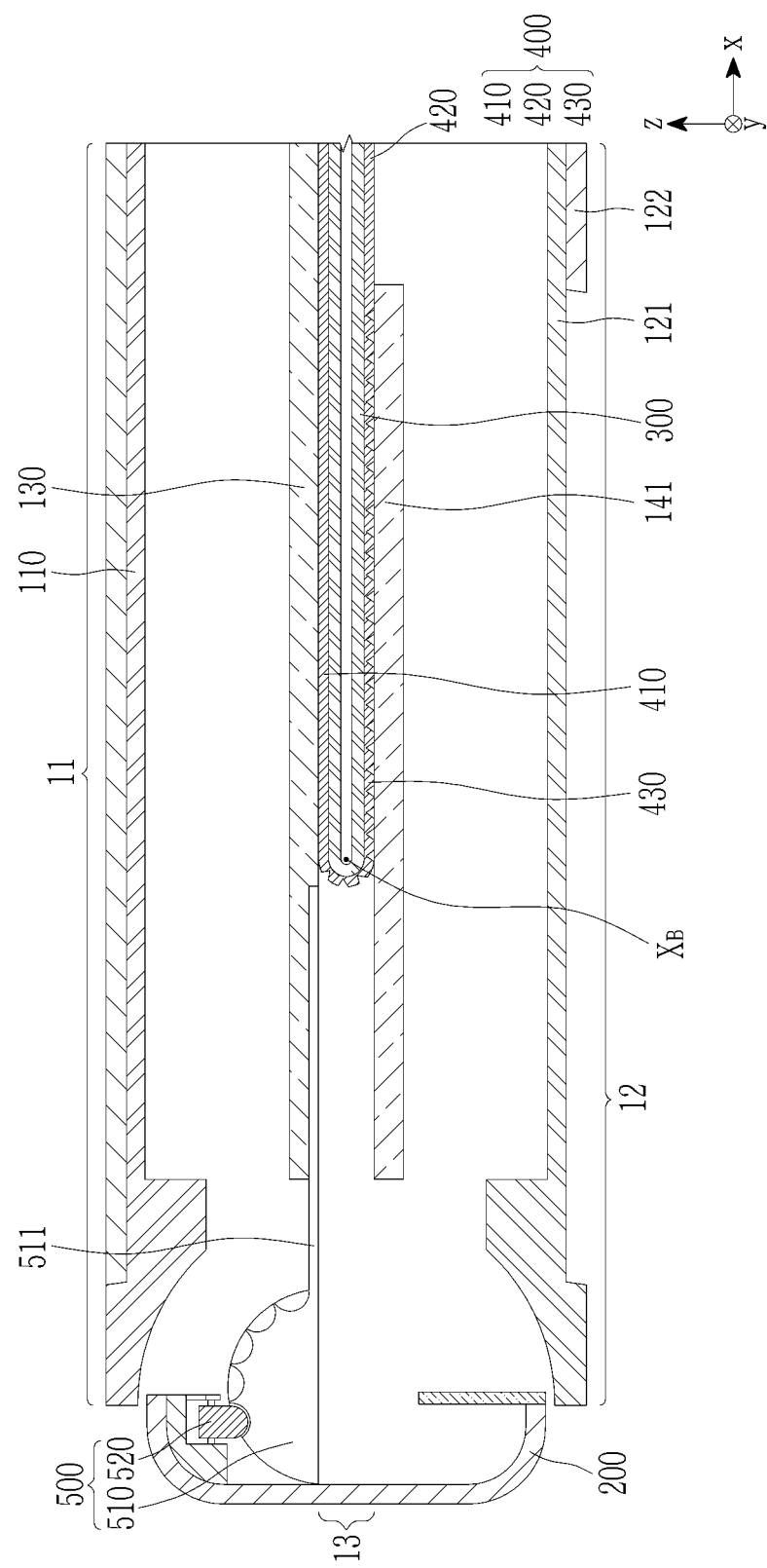
Figure 14:
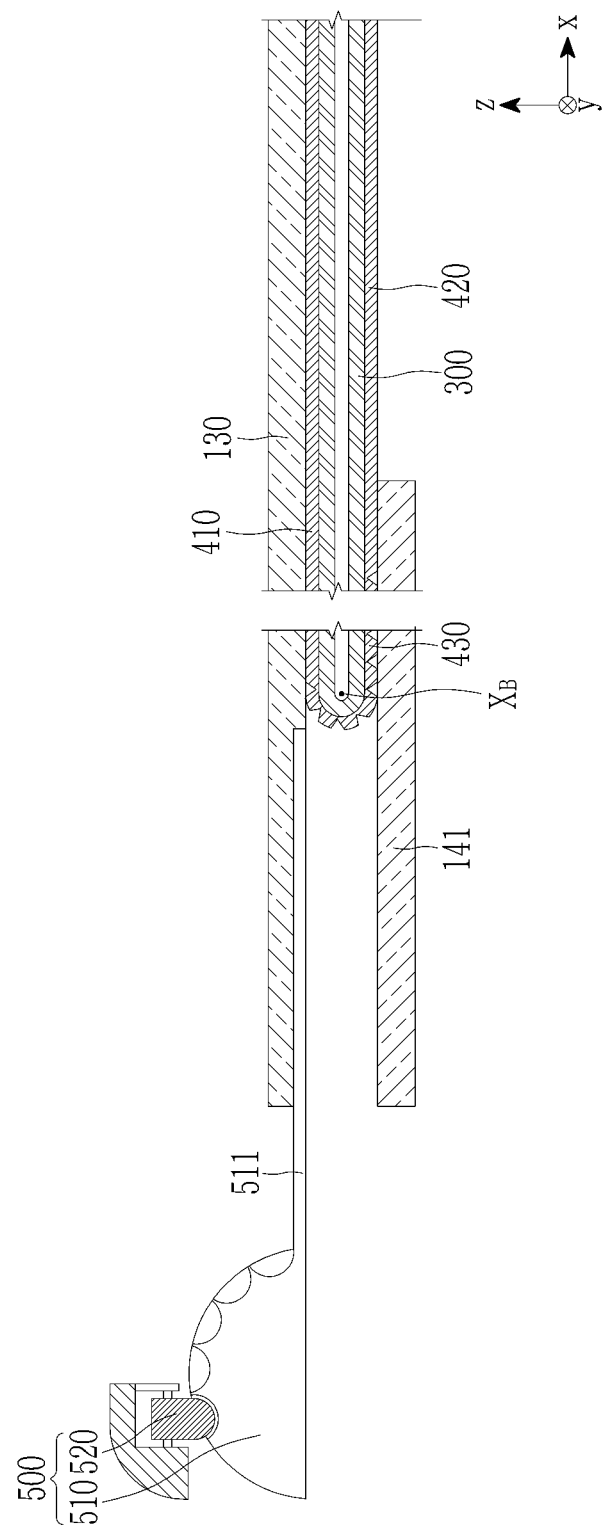

FIG. 12, FIG. 13, and FIG. 14 each illustrate schematic cross-sectional views showing a complete slide-out state in a display according to an embodiment. FIG. 12, FIG. 13, and FIG. 14 correspond to FIG. 6, FIG. 7, and FIG. 8, respectively.

FIG. 12, FIG. 13, and FIG. 14 illustrate a state in which the second flat area 12 is fully expanded within a designed range where the display device 1 is folded. In the display device 1 illustrated in FIG. 12, FIG. 13, and FIG. 14, the second part 122 slides out more than as illustrated in FIG. 9, FIG. 10, and FIG. 11. When the user further pulls the second part 122 of the second body part 120 in the first direction x, for example, the second part 122 may completely slide out to a designed range. The second part 142 of the second set plate 140 connected (or coupled or attached) to the second part 122 moves in the first direction x, and the second flat portion 420 of the support plate 400 attached to the second part 142 also moves in the first direction x.

Since the second flat portion 420 and the bendable portion 430 of the support plate 400 are not attached to the first part 141 of the first set plate 130 or the second set plate 140, the bendable portion 430 and the bending shaft $X_B$ may move in the first direction x as the bent area of the bendable portion 430 gradually moves toward the first flat portion 410. In a complete slide-out state, the area that is adjacent to the first flat portion 410 in the bendable portion 430 may be bent. An area that is other than the bent area of the bendable portion 430 may be positioned in the second flat area 12, and may be adjacent to the first part 141 of the second set plate 140. The bendable portion 430 and the bending shaft $X_B$ of the display panel 300 may be positioned between the first set plate 130 and the first part 141 of the second set plate 140. A distance at which the bending shaft $X_B$ moves in the first direction x may be about half of the distance at which the second part 122 (of the second body 120) slides out. A distance between the first part 141 and the second part 142 (of the second set plate 140) may be substantially the same as the distance at which the second part 122 (of the second body 120) slides out. Since the display panel 300 is attached to the support plate 400, the display panel 300 also moves together with the support plate 400, and the screen SR provided by the display panel 300 may be partially exposed.

The second flat area 12 may be expanded and the second part 122 of the second body 120 may slide out because an area of the support plate 400 is not attached to the first set plate 130 and the second set plate 140, allowing the support plate 400 and the bending shaft $X_B$ of the bendable portion 430 of the support plate 400 to move in a sliding direction. Accordingly, the expansion of the second flat area 12 and the slide-out of the second part 122 of the second body 120 may be possible in a state where the display device 1 is at least partially folded. The display device 1 may operate from a state where the second flat area 12 is expanded to a state where it is not expanded, (e.g., sliding from the state illustrated in FIG. 12 to the state illustrated in FIG. 9 and to the state illustrated in FIG. 6), and the second flat area 12 may be repeatedly expanded and restored to an original state.

Figure 15:
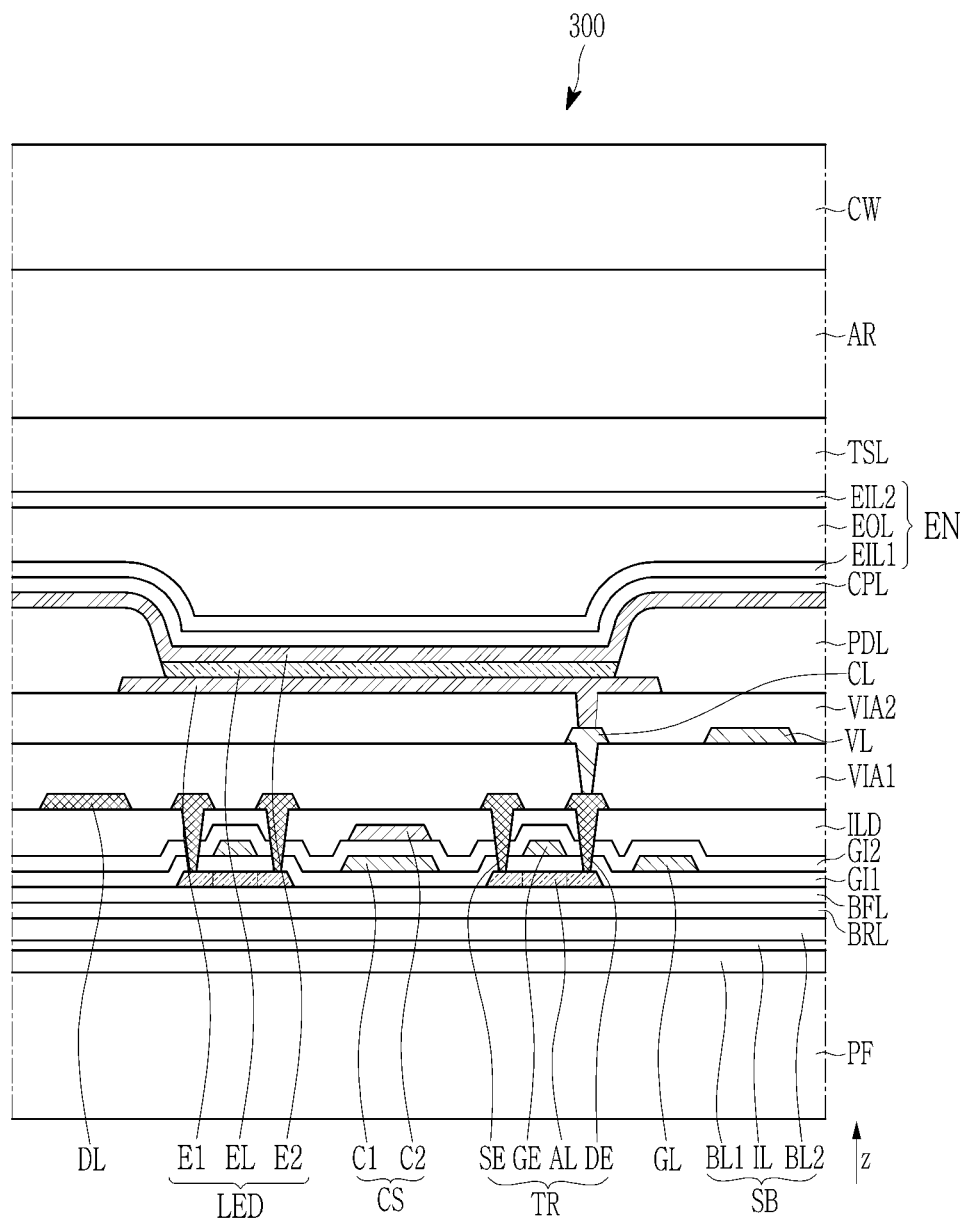
FIG. 15 illustrates a schematic cross-sectional view showing a stacked structure of a display panel according to an embodiment.

FIG. 15 illustrates a schematic cross-sectional view showing a stacked structure of the display panel 300 according to an embodiment. The cross-section illustrated in FIG. 15 may correspond to approximately a single pixel area.

The display panel 300 basically includes a substrate SB, a transistor TR formed on the substrate SB, and a light emitting diode LED connected to the transistor TR. The light emitting diode LED may correspond to the pixel.

The substrate SB may be a multilayer including a first base layer BL1, an inorganic layer IL, and a second base layer BL2. Each of the first and second base layers BL1 and BL2 may include a polymer resin such as polyimide, polyamide, or polyethylene terephthalate.

A barrier layer BRL that prevents moisture and oxygen from penetrating the substrate SB may be disposed. The buffer layer BRL may include an inorganic insulating material such as a silicon nitride ($SiN_x$), a silicon oxide ($SiO_x$), and a silicon oxynitride ($SiO_xN_y$), and may be a single layer or multiple layers.

A buffer layer BFL may be disposed on the barrier layer BRL. The buffer layer BFL may improve the characteristics of the semiconductor layer by blocking impurities from the substrate SB when the semiconductor layer is formed, and may flatten a surface of the substrate SB to relieve a stress of the semiconductor layer. The buffer layer BFL may include an inorganic insulating material such as a silicon nitride, a silicon oxide, and a silicon oxynitride, and may be a single layer or multiple layers. The buffer layer BFL may include amorphous silicon (Si).

A semiconductor layer AL of a transistor TR may be disposed on the buffer layer BFL. The semiconductor layer AL may include a first region and a second region, and a channel region therebetween. The semiconductor layer AL may include any one of amorphous silicon, polysilicon, and an oxide semiconductor. For example, the semiconductor layer AL may include low temperature polysilicon (LTPS), and may include an oxide semiconductor material including at least one of zinc (Zn), indium (In), gallium (Ga), and tin (Sn). For example, the semiconductor layer AL may include an indium-gallium-zinc oxide (IGZO).

A first gate insulating layer GI1 may be disposed on the semiconductor layer AL. The first gate insulating layer GI1 may include an inorganic insulating material such as a silicon nitride, a silicon oxide, and a silicon oxynitride, and may be a single layer or multiple layers.

The first gate conductive layer, which may include a gate electrode GE of the transistor TR, a gate line GL, and a first electrode C1 of a capacitor CS, may be disposed on the first gate insulating layer GI1. The first gate conductive layer may include molybdenum (Mo), aluminum (Al), copper (Cu), titanium (Ti), and the like, and may be a single layer or multiple layers.

A second gate insulating layer GI2 may be disposed on the first gate conductive layer. The second gate insulating layer GI2 may include an inorganic insulating material such as a silicon nitride, a silicon oxide, and a silicon oxynitride, and may be a single layer or multiple layers.

A second gate conductive layer that may include a second electrode C2 of the capacitor CS and the like may be disposed on the second gate insulating layer GI2. The second gate conductive layer may include molybdenum (Mo), aluminum (Al), copper (Cu), titanium (Ti), and the like, and may be a single layer or multiple layers.

An interlayer insulating layer ILD may be disposed on the second gate insulating layer GI2 and the second gate conductive layer. The interlayer insulating layer ILD may include an inorganic insulating material such as a silicon nitride, a silicon oxide, and a silicon oxynitride, and may be a single layer or multiple layers.

A first data conductive layer that may include a first electrode SE and a second electrode DE, a data line DL, and the like of the transistor TR may be disposed on the interlayer insulating layer ILD. The first electrode SE and the second electrode DE may be respectively electrically connected to a first region and a second region of the semiconductor layer AL through contact holes of the insulating layers GI1, GI2, and ILD. One of the first electrode SE and the second electrode DE may serve as a source electrode, and the other may serve as a drain electrode. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), copper (Cu), and the like, and may be a single layer or multiple layers.

A first planarization layer VIA1 may be disposed on the first data conductive layer. The first planarization layer VIA1 may be an organic insulating layer. For example, the first planarization layer VIA1 may contain poly(methyl methacrylate), a general purpose polymer such as polystyrene, a polymer derivative having a phenolic group, an acrylic polymer, an imide-based polymer, polyimide, and an organic insulating material such as a siloxane-based polymer.

A second data conductive layer, which may include a voltage line VL, a connection line CL, and the like, may be disposed on the first planarization layer VIAL. The voltage line VL may transfer voltages such as a driving voltage, a common voltage, an initialization voltage, and a reference voltage. The connection line CL may be connected to the second electrode DE of the transistor TR through a contact hole of the first planarization layer VIAL. The second data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), copper (Cu), and the like, and may be a single layer or multiple layers.

A second planarization layer VIA2 may be disposed on the second data conductive layer. The second planarization layer VIA2 may be an organic insulating layer. For example, the second planarization layer VIA2 may contain poly(methyl methacrylate), a general purpose polymer such as polystyrene, a polymer derivative having a phenolic group, an acrylic polymer, an imide-based polymer, polyimide, and an organic insulating material such as a siloxane-based polymer.

A first electrode E1 of the light emitting diode LED is disposed on the second planarization layer VIA2. The first electrode E1 may be referred to as a pixel electrode. The first electrode E1 may be electrically connected to the connection electrode CL through a contact hole formed in the second planarization layer VIA2. Accordingly, the first electrode E1 may be electrically connected to the second electrode DE of the transistor TR to receive a data signal for controlling luminance of the light emitting diode LED. The transistor TR to which the first electrode E1 is electrically connected may be a driving transistor or a transistor that is electrically connected to the driving transistor. The first electrode E1 may be formed of a reflective conductive material or a translucent conductive material, or may be formed of a transparent conductive material. The first electrode E1 may include a transparent conductive material such as an indium tin oxide (ITO) or an indium zinc oxide (IZO). The first electrode E1 may include a metal such as lithium (Li), calcium (Ca), aluminum (Al), silver (Ag), magnesium (Mg), or gold (Au), or a metal alloy.

A pixel definition layer PDL, which may be an organic insulating layer, may be disposed on the second planarization layer VIA2. The pixel definition layer PDL may be referred to as a partition wall, and may have an opening overlapping the first electrode E1.

An emission layer EL of the light emitting diode LED may be disposed on the first electrode E1. In addition to the emission layer EL, at least one of a hole injection layer, a hole transport layer, an electron transport layer, and an electron injection layer may be disposed on the first electrode E1.

A second electrode E2 of the light emitting diode LED is disposed on the emission layer EL. The second electrode E2 may be referred to as a common electrode. The second electrode E2 may be made of a low work function metal such as calcium (Ca), barium (Ba), magnesium (Mg), aluminum (Al), silver (Ag), or a metal alloy, as a thin layer to have light transmittance. The second electrode E2 may include a transparent conductive oxide such as an indium tin oxide (ITO) or an indium zinc oxide (IZO).

The first electrode E1, the emission layer EL, and the second electrode E2 of each pixel may constitute a light emitting diode LED, such as an organic light emitting diode. The first electrode E1 may be an anode of the light emitting diode LED, and the second electrode E2 may be a cathode of the light emitting diode LED.

A capping layer CPL may be disposed on the second electrode E2. The capping CPL may improve light efficiency by adjusting a refractive index. The capping layer CPL may be disposed to entirely cover the second electrode E2. The capping layer CPL may include an organic insulating material, or may include an inorganic insulating material.

An encapsulation layer EN may be disposed on the capping layer CPL. The encapsulation layer EN may encapsulate a light emitting diode LED to prevent moisture or oxygen from penetrating from the outside. The encapsulation layer EN may be a thin film encapsulation layer including one or more inorganic layers EIL1 and EIL2 and one or more organic layers EOL.

A touch sensor layer TSL including touch electrodes may be disposed on the encapsulation layer EN. The touch electrodes may have a mesh shape having an opening overlapping the light emitting diode LED. An anti-reflection layer AR for reducing external light reflection may be disposed on the touch sensor layer TSL.

A cover window CW for entirely protecting an entire surface of the display panel 300 may be positioned on the anti-reflection layer AR. The cover window CW may be optically transparent, and may be a flexible window in which at least a portion thereof may be bent. For example, in the cover window CW, at least an area thereof corresponding to the bendable area 13 of the display device 1 may be flexible and bent, and may be entirely flexible.

The cover window CW may be, for example, a polymer film made of a polymer such as polyimide (PI), polyethylene terephthalate (PET), and polyurethane (PU) for flexible characteristics. The cover window CW may be a glass film in which an area thereof corresponding to at least the bendable area 13 of the display device 1 is formed to be thin, or a glass film that is formed to be entirely thin (e.g., with a thickness of about 150 μm to about 300 μm). The cover window CW may be attached to the anti-reflection layer AR by using an adhesive such as an optically clear adhesive (OCA) or a pressure sensitive adhesive (PSA).

A passivation film PF may be disposed to protect the display panel 300 below the substrate SB. A functional sheet (not illustrated) may include at least one of a cushion layer, a heat dissipation sheet, a light blocking sheet, a waterproof tape, and an electromagnetic barrier layer positioned under the passivation film PF.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
   a first body and a second body;
   a hinge part disposed between the first body and the second body and connected to the first body and the second body;
   a support plate connected to the first body and the second body; and
   a display panel connected to the support plate such that a portion of the display panel spaced apart from any edge of the display panel directly contacts the support plate, wherein
   the second body includes a first part and a second part that are slidably engaged,
   the second part of the second body slides out from the first part of the second body,
   the display panel includes a screen that displays an image, and
   a portion of the screen disposed on the second body is concealed by the first body when the display device is in a folded state.

2. The display device of claim 1, wherein
   in the folded state, part of the screen on the second body is exposed in case that the second part of the second body slides out from the first part of the second body.

3. A display device comprising:
   a first body and a second body;
   a hinge part disposed between the first body and the second body and connected to the first body and the second body;
   a support plate connected to the first body and the second body; and
   a display panel connected to the support plate, wherein
   the second body includes a first part and a second part that are slidably engaged,
   the second part of the second body slides out from the first part of the second body,
   the first body includes a first set plate,
   the second body includes a second set plate,
   the second set plate includes a first part and a second part respectively corresponding to the first part of the second body and the second part of the second body,
   the support plate is connected to the first set plate and the second part of the second set plate, and
   the support plate is not connected to the first part of the second set plate.

4. The display device of claim 3, wherein
   the support plate includes:
   a first flat portion;
   a second flat portion; and
   a bendable portion disposed between the first flat portion and the second flat portion,
   the first flat portion is connected to the first set plate,
   the second flat portion is connected to the second part of the second set plate, and
   the bendable portion is not connected to the first set plate and not connected to the second set plate.

5. The display device of claim 4, wherein
   the bendable portion is bent with respect to a bending shaft in a folded state where the first body and the second body face each other, and
   the bending shaft moves in a sliding direction in case that the second part of the second body slides out from the first part of the second body.

6. The display device of claim 5, wherein
   a bent area of the bendable portion moves toward the first flat portion in case that the second part of the second body slides out from the first part of the second body.

7. The display device of claim 5, wherein
   a moving distance of the bending shaft is half of a distance at which the second part of the second body slides out in case that the second part of the second body slides out from the first part of the second body.

8. The display device of claim 4, wherein
   a region of the display panel connected to the second flat part is exposed in case that the second part of the second body slides out from the first part of the second body.

9. The display device of claim 3, wherein
   a distance between the first part of the second set plate and the second part of the second set plate increases in case that the second part of the second body slides out from the first part of the second body.

10. The display device of claim 3, wherein
    the hinge part includes a shaft and hinges, and
    the hinges include:
    a first hinge connected to the shaft and the first set plate; and
    a second hinge connected to the shaft and the first part of the second set plate.

11. A display device comprising:
    a first body;
    a second body including a first part and a second part that are slidably engaged;
    a display panel disposed on the first body and the second body; and
    a support plate having a first surface facing the display panel and a second surface facing an opposite direction to the first surface, wherein
    the first surface of the support plate is connected to the display panel,
    the second surface of the support plate is connected to the first body and the second part of the second body, and
    the second surface of the support plate is not connected to the first part of the second body.

12. The display device of claim 11, wherein
    the first body includes a first set plate,
    the second body includes a second set plate,
    the second set plate includes a first part and a second part respectively corresponding to the first part of the second body and the second part of the second body,
    the support plate is connected to the first set plate and the second part of the second set plate, and
    the support plate is not connected to the first part of the second set plate.

13. The display device of claim 12, wherein
    the support plate includes:
    a first flat portion;
    a second flat portion; and
    a bendable portion disposed between the first flat portion and the second flat portion,
    the first flat portion is connected to the first set plate,
    the second flat portion is connected to the second part of the second set plate, and
    the bendable portion is not connected to the first set plate and not connected to the second set plate.

14. The display device of claim 13, wherein
    the bendable portion is bent with respect to a bending shaft in a folded state where the first body and the second body face each other, and the bending shaft moves in a sliding direction in case that the second part of the second body slides out from the first part of the second body.

15. The display device of claim 14, wherein a bent area of the bendable portion moves toward the first flat portion in case that the second part of the second body slides out from the first part of the second body.

16. The display device of claim 14, wherein a moving distance of the bending shaft is half of a distance at which the second part of the second body slides out in case that the second part of the second body slides out from the first part of the second body.

17. The display device of claim 14, wherein a region of the display panel connected to the second flat part is exposed in case that the second part of the second body slides out from the first part of the second body.

18. The display device of claim 12, wherein a distance between the first part of the second set plate and the second part of the second set plate increases in case that the second part of the second body slides out from the first part of the second body.

19. The display device of claim 12, further comprising: a hinge part connected to the first body and the second body, wherein
the hinge part includes a shaft and hinges, and
the hinges include:
  a first hinge connected to the shaft and the first set plate; and
  a second hinge connected to the shaft and the first part of the second set plate.

20. The display device of claim 11, wherein
the first part of the second body includes a wing and a guide that are perpendicular to each other,
the second part of the second body includes a wing and a guide that are perpendicular to each other,
an inner surface of the wing of the second part contacts an outer surface of the wing of the first part, and
an outer surface of the guide of the second part contacts an inner surface of the guide of the first part.

* * * * *